United States Patent
Furukawa et al.

(10) Patent No.: US 6,510,690 B2
(45) Date of Patent: Jan. 28, 2003

(54) DIESEL ENGINE WITH SUPERCHARGER

(75) Inventors: Hideo Furukawa, Oyama (JP); Hiroyasu Satou, Oyama (JP)

(73) Assignee: Komatsu Ltd., Tokyo (JP)

( * ) Notice: Subject to any disclaimer, the term of this patent is extended or adjusted under 35 U.S.C. 154(b) by 55 days.

(21) Appl. No.: 09/805,180

(22) Filed: Mar. 14, 2001

(65) Prior Publication Data

US 2001/0023588 A1 Sep. 27, 2001

(30) Foreign Application Priority Data

Mar. 27, 2000 (JP) ........................... 2000-087618
Jan. 24, 2001 (JP) ........................... 2001-015367

(51) Int. Cl.[7] .................... B60T 13/20; F02B 33/00
(52) U.S. Cl. .................... 60/599; 123/563; 123/559.1
(58) Field of Search ................. 123/563, 559.1; 60/599

(56) References Cited

U.S. PATENT DOCUMENTS

| | | | | |
|---|---|---|---|---|
| 3,027,706 A | * | 4/1962 | Sprick | 60/599 |
| 3,976,041 A | * | 8/1976 | Mettig et al. | 123/563 |
| 4,062,188 A | * | 12/1977 | Cutler et al. | 60/599 |
| 4,075,991 A | * | 2/1978 | Mettig et al. | 123/563 |
| 4,258,550 A | * | 3/1981 | Hinkle et al. | 60/599 |
| 4,317,439 A | * | 3/1982 | Emmerling | 123/563 |
| 4,485,624 A | * | 12/1984 | Melchior | 60/599 |
| 4,736,727 A | * | 4/1988 | Williams | 123/563 |
| 4,918,923 A | * | 4/1990 | Woollenweber et al. | 60/599 |
| 4,997,033 A | * | 3/1991 | Ghiani et al. | 123/563 |
| 5,036,668 A | * | 8/1991 | Hardy | 123/563 |
| 6,029,637 A | * | 2/2000 | Prior | 123/563 |

FOREIGN PATENT DOCUMENTS

| | | | | |
|---|---|---|---|---|
| GB | 2 055 963 A | * | 11/1981 | 60/599 |
| JP | 57-35116 | | 2/1982 | |
| JP | 3-4731 | | 1/1991 | |

* cited by examiner

*Primary Examiner*—Thomas Denion
*Assistant Examiner*—Thai-Ba Trieu
(74) *Attorney, Agent, or Firm*—Armstrong, Westerman, Hattori, LLP.

(57) ABSTRACT

A diesel engine with a supercharger, which hardly has an adverse effect on performance even if a fuel of inferior ignitability is used, is provided. For this purpose, the diesel engine includes a supercharger (1) for supplying pressurized supercharged air into a cylinder (31), and a heat exchanger, which is provided in a supercharged air passage from an outlet port of the supercharger to an inlet port of the cylinder, and the heat exchanger is a hybrid type of heat exchanger (2) including a first heat exchanger (2a) for carrying out heat exchange between the supercharged air from the outlet port of the supercharger and a first heat exchange medium, and a second heat exchanger (2b) for carrying out heat exchange between the supercharged air from an outlet port of the first heat exchanger and a second heat exchange medium having higher temperature than the first heat exchange medium.

8 Claims, 8 Drawing Sheets

DIESEL ENGINE WITH SUPERCHARGER

TECHNICAL FIELD

The present invention relates to a diesel engine with a supercharger.

BACKGROUND ART

A diesel engine with a supercharger generally includes a heat exchanger in a supercharged air passage from an outlet port of the supercharger to an inlet port of a cylinder, and cools supercharged air that has pressure and temperature increased by the supercharger. As the heat exchanger, an air cooling type of heat exchanger with outside air as a heat exchange medium, or a water cooling type of heat exchanger with the cooling water as a heat exchange medium is generally used.

For example, Japanese Patent Laid-open No. 57-35116 and Japanese Patent Publication No. 3-4731 disclose "a hybrid type of heat exchanger including a water cooling type of heat exchanger at an upstream side, and an air cooling type of heat exchanger at a downstream side, which has a bypass supercharged air passage with an on-off valve, in the order from an outlet port of a supercharger to an inlet port of a cylinder". It should be noted that the latter is an improvement over the former, and the latter has the configuration in which the water cooling type of heat exchanger at the upstream side together with the on-off valve is housed in an upper tank of the air cooling type of heat exchanger at the downstream side. This configuration provides the operation and effects that the upper tank is also used as the bypass supercharged air passage and thereby the compact diesel engine with the supercharger is provided.

The above conventional configurations, however, have the following disadvantages, which cannot make the engine as compact as expected.

(1) The temperature of cylinder intake air varies to a large extent according to the driving conditions (atmosphere temperature, engine load, and the like). The temperature of the cylinder intake air becomes extremely cold due to low-temperature atmosphere in cold regions, severely cold regions, and the winter season, and, for example, under medium and heavy load, an excess air ratio increases, whereby combustion efficiency increases, thereby producing excessive output power contrary to the intention. Further, since the temperature is low inside the cylinder under light load, poor ignition easily occurs, and thus it is difficult to operate engine with stability. On the other hand, in tropical regions and in the summer season, the temperature of exhaust gas rises due to high-temperature atmosphere under heavy load, thereby decreasing durability of the components constructing the engine. In addition to the above disadvantages, there is a heat balance problem of the engine main body corresponding to a change in engine load. Accordingly, with only an air cooling type of heat exchanger, the heat exchanger itself increases in size and the heat exchanger needs to be provided with an air flow adjusting mechanism such as a large shutter or the like, thus making the heat exchanger system itself larger in size. Meanwhile, with only a water cooling heat exchanger, a large quantity of cooling water is needed, thus making a cooling system such as a cooling radiator and the like larger in size. Specifically, the water cooling type of heat exchanger alone or the air cooling type of heat exchanger alone is unfavorable in making the engine compact.

(2) As for the temperatures of outside air, cooling water, and supercharged air at the supercharger outlet port during normal rotation of the engine, the temperature is higher in the order of "the outside air temperature<the cooling air temperature<the supercharged air temperature at the supercharger outlet port". The aforementioned "during normal rotation of the engine" means "after the starting of the engine, and during the rotation of the engine after the completion of warming-up, that is, during rotation of the engine irrespective of a low idle or a high idle, and the magnitude of load". In the aforesaid conventional hybrid type of heat exchanger, the water cooling type of heat exchanger is provided at the upstream side, and therefore the engine cooling water is heated by a high-temperature supercharged air. Consequently, a large amount of cooling water is required to secure heat balance of the engine body corresponding to a change in engine load, whereby the radiator for cooling water and the like are made larger in size and the cooling system increases in size. Namely, even with the aforesaid conventional hybrid type of heat exchanger, the engine cannot be made as compact as expected.

(3) As for a diesel fuel, light oil is generally used, but fuels inferior to light oil in ignitability with normal compression ratio, for example, fuel oil A, a waste plastic oil fuel, a water emulsion fuel (fuel made by mixing fuel and water and emulsifying the same) and the like are sometimes used. Explaining with the water emulsion fuel as an example, as seen from the actual measurement results of the three types of engines shown in FIG. 10, this fuel has an effect of reducing injurious materials such as nitrogen oxides, black lead and the like, which are exhausted from a diesel engine, as a result of increasing content of water in the fuel. However, if the amount of water is increased in the above fuel, the aforesaid disadvantage (specifically, "abnormal combustion easily occurs in the cylinder, which makes it difficult to operate the engine with stability") is promoted when the temperature of intake air of the cylinder is low (in cold regions, in severely cold regions, in the winter season, and under light load, etc.). When the content of water reaches 50%, the operation becomes unstable even at a room temperature. This is because water in the water emulsion fuel injected during the compression stroke of the engine vaporizes and the temperature inside the cylinder is reduced by the latent heat, whereby ignition and combustion of the water emulsion fuel (that is, engine performance) are hindered.

SUMMARY OF THE INVENTION

The present invention is made in view of the aforesaid disadvantages, and its object is to provide a diesel engine with a supercharger, which is capable of contributing to reduced engine in size, and which hardly has an adverse effect on the engine performance even with use of a fuel inferior to light oil in ignitability with a normal compression ratio.

In order to attain the above object, a first configuration of a diesel engine with a supercharger according to the present invention is a diesel engine with a supercharger including a supercharger for taking in and pressurizing outside air and supplying the pressurized supercharged air into a cylinder, and a heat exchanger, which is provided in a supercharged air passage from an outlet port of the supercharger to an inlet port of the cylinder and cools the supercharged air from the supercharger, and the heat exchanger is a hybrid type of heat exchanger including a first heat exchanger for carrying out heat exchange between the supercharged air from the outlet port of the supercharger and a first heat exchange medium, and a second heat exchanger for carrying out heat exchange between the supercharged air from an outlet port of the first heat exchanger and a second heat exchange medium having higher temperature than the first heat exchange medium, and supplying the supercharged air after the heat exchange with the second heat exchange medium to the cylinder.

As a second configuration of the diesel engine with the supercharger, a fuel used may be a water emulsion fuel.

As a third configuration of the diesel engine with the supercharger, the engine may be a water cooling type of engine with use of cooling water, the first heat exchange medium is outside air, and the second heat exchange medium is cooling water from the water cooling type of engine.

As a fourth configuration of the diesel engine with the supercharger, it may be suitable to further include load detecting means for detecting load of the engine, and control means for receiving a detection signal from the load detecting means and controlling flow of the second heat exchange medium or flow of cooling water from the water cooling type of engine.

As a fifth configuration of the diesel engine with the supercharger, it may be suitable that the engine (or the water cooling type of engine) is used at an almost constant engine speed, and the diesel engine with the supercharger further includes a pressure sensor which is provided between an outlet port of a compressor of the supercharger and an inlet port of the cylinder and detects supercharged air pressure, and control means for receiving a detection signal from the pressure sensor and controlling flow of the second heat exchange medium or flow of cooling water from the water cooling type of engine.

A sixth configuration of the diesel engine with the supercharger according to the present invention is in a diesel engine with a supercharger including a supercharger for taking in and pressurizing outside air and supplying the pressurized supercharged air into a cylinder, and a heat exchanger, which is provided in a supercharged air passage from an outlet port of the supercharger to an inlet port of the cylinder and cools the supercharged air from the supercharger, a fuel used is a fuel inferior to light oil in ignitability, and means for maintaining temperature of the supercharged air supplied to the cylinder at a predetermined value is included.

The operations and effects of the above first to sixth configurations will be explained.

(1) As for the choice of the heat exchange medium, outside air, tap water (for example, in the case of stationary type of diesel generator engine), cooling tower cooling water (for example, in the case of stationary type of diesel generator engine), seawater (for example, in the case of a shipboard engine), engine lubricant oil, engine cooling water (for example, in the case of a water cooling type of engine), and the like can be cited as examples. When the choice of the heat exchange mediums during normal rotation of the engine is divided in two according to the degree of temperature, outside air, tap water, cooling tower cooling water and seawater are at a lower temperature side; and lubricant oil and cooling water are at a higher temperature side. Specifically, in the first configuration, outside air, tap water, cooling tower cooling water, and seawater correspond to the first heat exchange medium, while lubricant oil and cooling water correspond to the second heat exchange medium.

Thus, based on the first configuration, if supercharged air of high temperature is cooled by the outside air, tap water, cooling tower cooling water, and seawater which are the choice of the first heat exchange mediums, the temperature of the supercharged air after being cooled becomes lower than that of the lubricant oil and the cooling water which are the choice of the second heat exchange mediums according to a normal design. Specifically, the supercharged air cooled in the first heat exchanger is heated thereafter by the lubricant oil and cooling water which are the choice of the second heat exchange mediums in the second heat exchanger. The temperature of the second heat exchange medium does not change to a large extent. Hence, the temperatures of intake air of the cylinder converge on a narrow range less than or equal to the temperature of the lubricant oil and the cooling water irrespective of the temperature of outside air and load on the engine. Further in this situation, the second heat exchanger works as a cooler for the lubricant oil and cooling water. Accordingly, a lubricant oil system and a cooling water system, which are heat balance sources for a change in engine load are made compact, which specifically contributes to the engine itself reduced in size.

Even if the temperature of supercharged air after being cooled by the first heat exchanger is higher than those of the lubricant oil and the cooling water, the lubricant oil and cooling water, which are the choice of the second heat exchange mediums, cool the supercharged air once again. In this situation, the second heat exchanger works as a heater for the lubricant oil and cooling water, but the heat exchange amount is small in general. In this situation, basic heat balance of the engine main body corresponding to a change in engine load is not adversely influenced to a large extent, and therefore reduction in the size of the lubricant oil system and the cooling water system, specifically, reduction in size of the engine itself is not hindered.

Specifically, according to the first configuration, the diesel engine with the supercharger equipped with a highly efficient supercharged air cooling mechanism is provided. Naturally, it is not necessary to provide "a bypass supercharged air passage with an on-off valve" as in the conventional hybrid type of heat exchanger, which also contributes to the reduction in the size of not only the supercharged air cooling mechanism but also the engine itself.

(2) The second configuration has the aforesaid operation and effects of the first configuration that "the temperatures of intake air of the cylinder converge on a narrow range less than or equal to the temperature of the lubricant oil and the cooling water irrespective of the temperature of outside air and load on the engine". Accordingly, even if a water emulsion fuel is used as a fuel used, or even if the quantity of water in the water emulsion fuel is large, abnormal combustion hardly occurs in the cylinder, and stable engine operation can be performed. As a result of the experiments, it is confirmed that a stable operation can be performed even if the water content in the fuel exceeds 50 volume %. Thus, injurious materials such as nitrogen oxides, black lead and the like exhausted from the engine can be reduced without adverse effects given to the engine performance.

(3) The outside air being the first heat exchange medium and the cooling water being the second heat exchange medium in the third configuration are examples of the choice of the heat exchange mediums mentioned in the description of the operations and effects of the first configuration. Consequently, according to the third configuration, the operation and effects based on the first configuration can be obtained as they are.

(4) According to the first to the third configuration, "the temperatures of intake air of the cylinder converge on a narrow range less than or equal to the temperature of the lubricant oil and the cooling water irrespective of the temperature of outside air and load on the engine" as described in the operation and effects of the first configuration, but in the fourth configuration, the control means for controlling the flow of the second heat exchange medium (or the flow of the cooling water from the water cooling type of engine) supplied to the second heat exchanger according to load of the engine is provided. As a result, when the load is heavy, the flow of the second heat exchange medium is stopped or reduced, whereby supercharged air sufficiently cooled is supplied to the engine to thereby secure output power. When the load is light, the flow of the second heat exchange medium is increased to the full-throttle level, or just increased, whereby supercharged air is warmed to ensure ignition of the engine, thus making it possible to decrease discharge amount of white smoke and reduce variation of the rotational frequency.

(5) If the engine speed is almost constant, positive correlation exists between the load of the engine and the supercharged air pressure. In the fifth configuration, based on the first to third configurations, control means for controlling the flow of the second heat exchange medium ((or the flow of the cooling water from the water cooling type of engine) in accordance with supercharged air pressure of the engine is provided. As a result, the flow of the second heat exchange medium supplied to the second heat exchanger is controlled in accordance with supercharged air pressure of the engine (specifically, the load of the engine), thereby making it possible to obtain the same operation and effects as in the fourth configuration.

(6) The sixth configuration is higher conceptualization of the fourth configuration citing the second configuration. In concrete, "a water emulsion fuel" is "a fuel inferior to light oil in ignitability", and "load detecting means and control means" are "means for maintaining the temperature of supercharged air supplied to the cylinder at a predetermined value". Accordingly, each operation and effect described in the operations and effects in the second and fourth configuration can be obtained.

BEST MODE FOR CARRYING OUT THE INVENTION

Preferred embodiments of the present invention will be explained below with reference to the drawings. FIG. 1 to FIG. 4 show a first embodiment.

Figure 1:
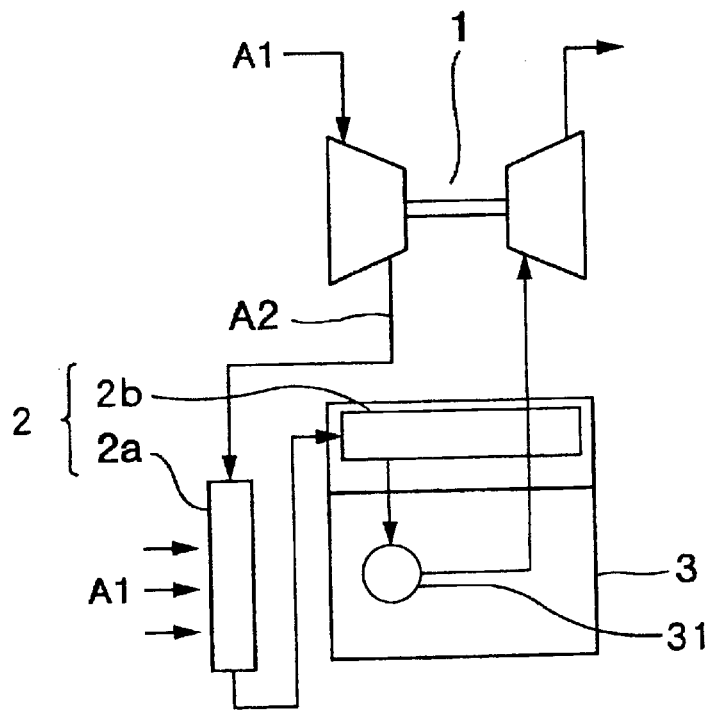
FIG. 1 is a block diagram of a first embodiment of the present invention.

An engine 3 of the first embodiment is a water cooling type of diesel engine with a supercharger 1 and a hybrid heat exchanger 2, in which supercharged air A2 that is outside air A1 taken in and pressurized in a supercharger 1 is supplied into a cylinder 31 via a first heat exchanger 2a and a second heat exchanger 2b arranged in series, as shown in a block diagram in FIG. 1.

The first heat exchanger 2a at an upstream side composing the hybrid heat exchanger 2 is an air cooling type of heat exchanger with the outside air A1 as a heat exchange medium, and is simply referred to as the air cooling type of heat exchanger 2a hereinafter. Meanwhile, the second heat exchanger 2b at a downstream side is a water cooling type of heat exchanger with cooling water (not shown) of a main body of the engine 3 as a heat exchange medium, and is simply referred to as the water cooling type of heat exchanger 2b, hereinafter.

Figure 2:
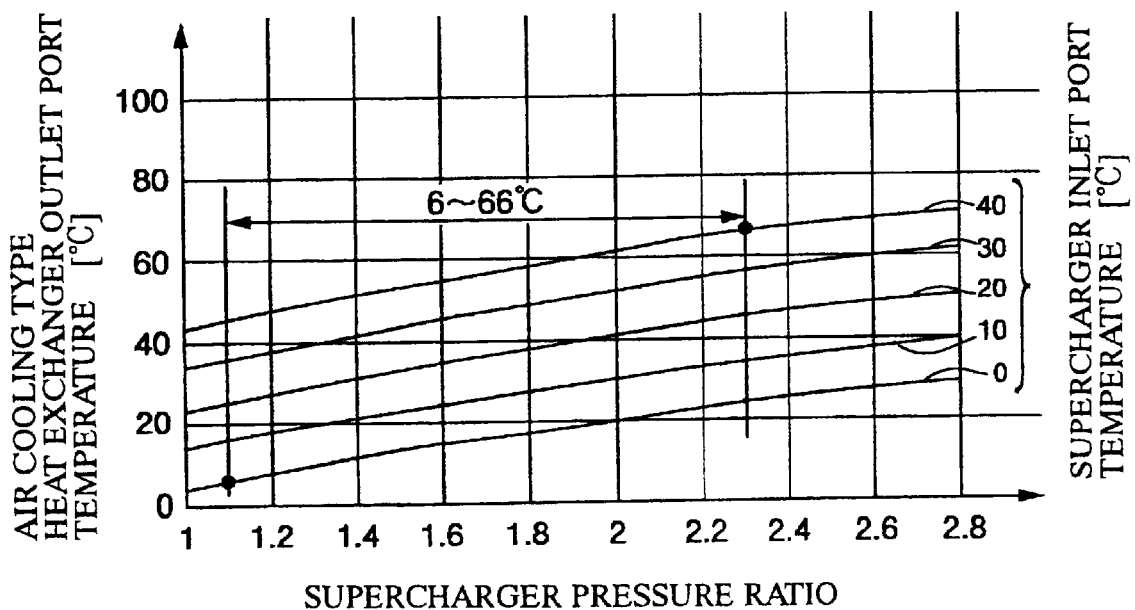
FIG. 2 is a graph of unit performance of a first heat exchanger according to the first embodiment.
Figure 3:
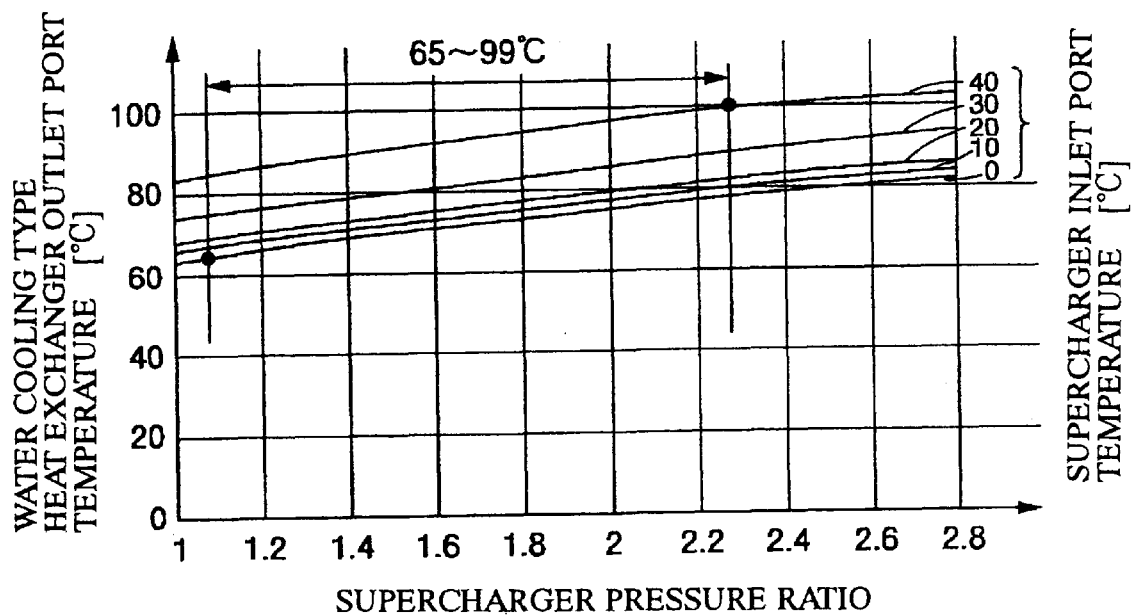
FIG. 3 is a graph of unit performance of a second heat exchanger according to the first embodiment.
Figure 4:
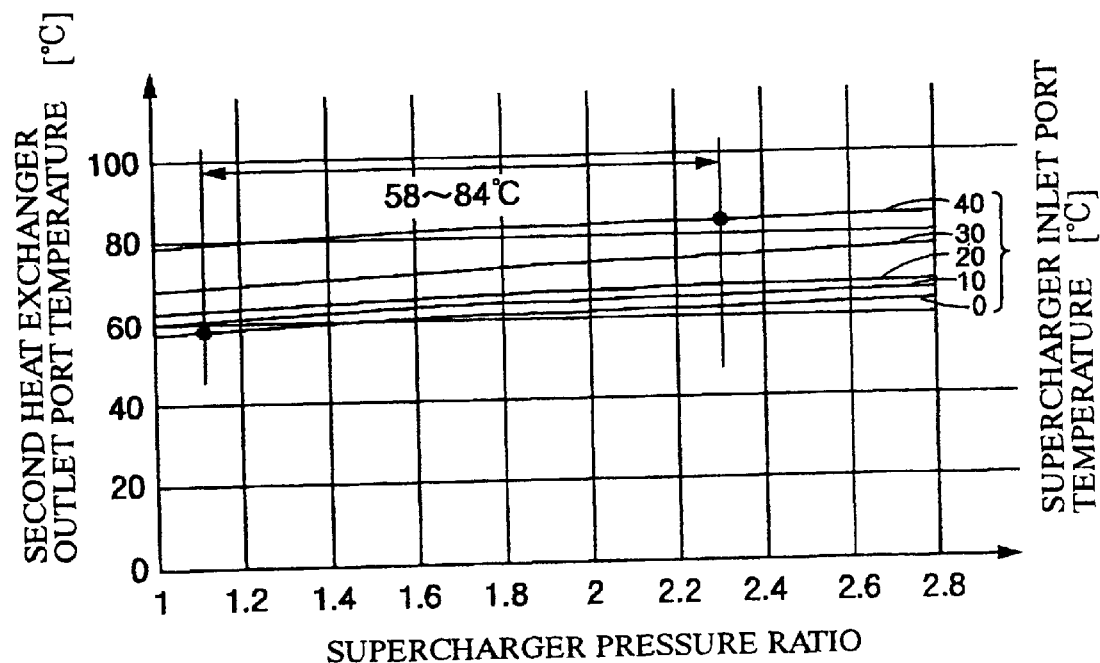
FIG. 4 is a graph of performance of a hybrid type of heat exchanger according to the first embodiment.

The operation and effects of the first embodiment will be explained with reference to FIG. 2 to FIG. 4. FIG. 2 to FIG. 4 are graphs of the relationship between a supercharger pressure ratio (the horizontal axis) and an outlet supercharged air temperature of each of the heat exchangers 2a, 2b, and 2 with inlet intake air temperatures (0° C., 10° C., 20° C., 30° C., and 40° C.) as parameters. Temperature effectiveness of the air cooling type of heat exchanger 2a in FIG. 2 is about 80%, and that of the water cooling type of heat exchanger 2b in FIG. 3 is about 85%. The details are as follows.

Regarding unit performance of each of the heat exchangers 2a and 2b when the inlet intake air temperature of each of the heat exchangers 2a and 2b is 0° C., 10° C., 20° C., 30° C., or 40° C. in a working range of the supercharger 1 (the pressure ratio is about 1.1 to 2.3), the outlet supercharged air temperature of the air cooling type of heat exchanger 2a is about 6° C. to 66° C. as shown in FIG. 2. The temperature of outside air, which is the heat exchange medium, is compensated to be a value obtained by adding 5° C. to each temperature of inlet intake air to the supercharger 1, considering that the air cooling type of heat exchanger 2a is positioned near the engine 3. Meanwhile, the outlet supercharged air temperature of the water cooling type of heat exchanger 2b is about 65° C. to 99° C. as shown in FIG. 3. The temperature of cooling water, which is the heat exchange medium, is about 75° C. to 90° C.

The outlet supercharged air temperatures of the hybrid type of heat exchanger 2, however, converge on a narrow range of about 58° C. to 84° C. as shown in FIG. 4. Specifically, the intake air temperatures of the cylinder 31 converge on a narrow range irrespective of outside air temperature and load on the engine. In addition, supercharged air is cooled by outside air (the first heat exchange medium) in the air cooling type of heat exchanger 2a (the first heat exchanger 2a), but it is heated by cooling water (the second heat exchange medium) in the water cooling type of heat exchanger 2b (the second heat exchanger 2b). In other words, since cooling water is cooled in the water cooling type of heat exchanger 2b, heat balance for the main body of the engine 3 by means of cooling water can be properly achieved with less cooling water, and the engine 3 itself can be made compact correspondingly. In the first embodiment, "a bypass supercharged air passage with an on/off valve" is not included as in a conventional hybrid heat exchanger, and therefore not only the main body of the supercharged air cooling mechanism but also the engine 3 itself can be made compact correspondingly.

Figure 10:
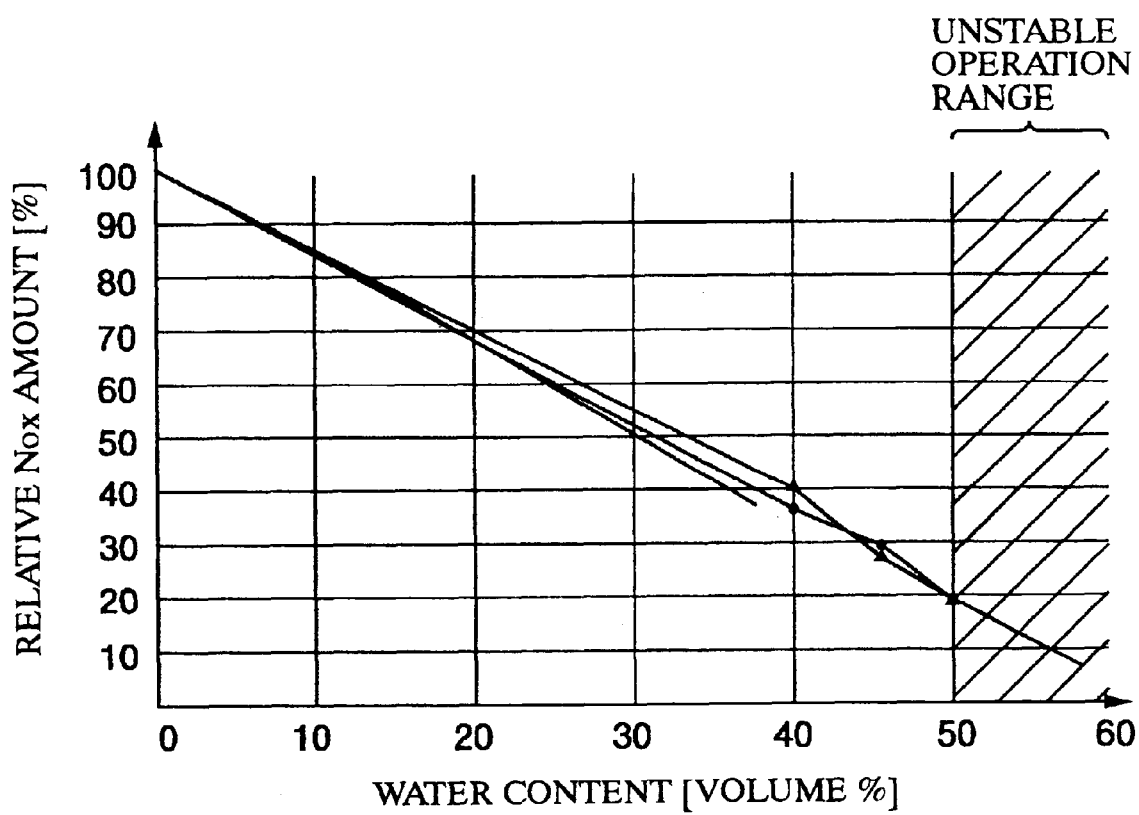
FIG. 10 is a graph of characteristics of a water emulsion fuel in a conventional diesel engine.

When a water emulsion fuel is used in the above, the following effect can be obtained. Specifically, since the temperatures of intake air of the cylinder 31 converge within the proper temperature range of about 58° C. to 84° C. as described above, it is confirmed by experiments that a stable operation can be performed even with the water emulsion fuel with 50 volume % of water content shown in FIG. 10. Accordingly, it is possible to reduce injurious materials such as nitrogen oxides, black lead and the like, which are exhausted from the engine 3.

Figure 5:
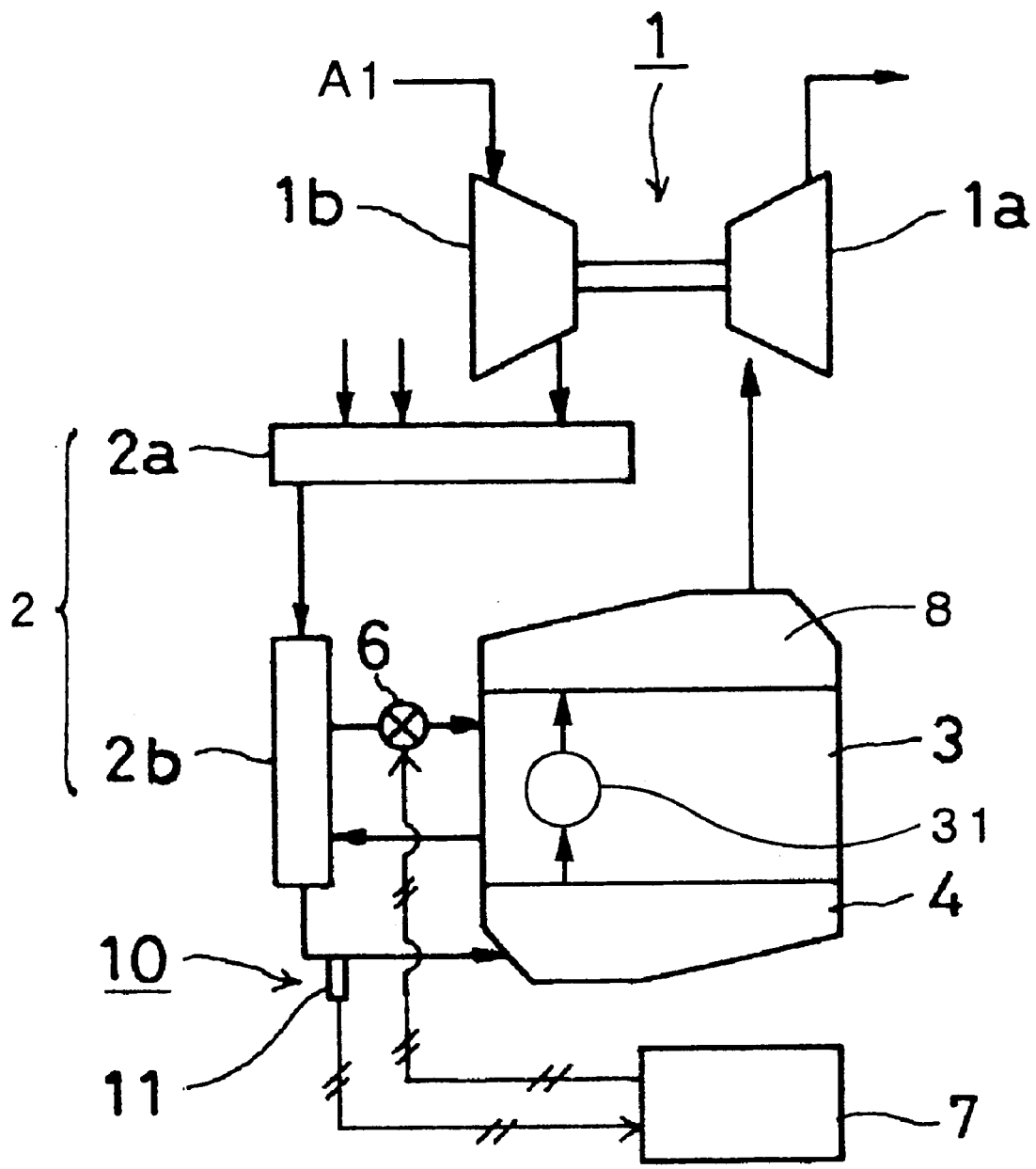
FIG. 5 is a block diagram of a second embodiment of the present invention.

FIG. 5 is a block diagram showing a second embodiment, and the same components as in the first embodiment are given the identical reference numerals and symbols to omit the explanation thereof, and only the portions different from the first embodiment will be explained. The supercharger 1 has an exhaust turbine 1a driven by exhaust and a compressor 1b for supercharging the outside air A1. Specifically, supercharged air from the compressor 1b is supplied into the cylinder 31 via the air cooling type of heat exchanger 2a, the water cooling type of heat exchanger 2b, and an intake manifold 4, and exhaust air from the cylinder 31 is discharged to the exhaust turbine 1a via an exhaust manifold 8.

The engine 3 is operated at an almost constant speed, for example, when driving a generator and the like. If the speed of the engine 3 is almost constant as described above, positive correlation exists between load of the engine 3 and supercharged air pressure. Thus, a pressure sensor 11 for detecting the supercharged air pressure is provided between the water cooling type of heat exchanger 2b and the inlet port of the cylinder 31. In the second embodiment, the pressure sensor 11 defines load detecting means 10 for the engine 3. As for a position at which the pressure sensor 11 is provided, any position may be suitable as long as it exits between an outlet port of the compressor 1b of the supercharger 1 and the inlet port of the cylinder 31.

Further, a solenoid type of flow control valve 6 is provided in an outlet side passage (or an inlet side passage may be suitable) for cooling water from the water cooling type of heat exchanger 2b to the engine 3. The pressure sensor 11 and the flow control valve 6 are connected to a controller 7 comprising a microcomputer or the like. Thus, the controller 7 feeds driving current to the flow control valve 6 to control the flow of cooling water so that the temperature of the supercharged air at the outlet port of the second heat exchanger 2b is within a predetermined temperature range, when the detected pressure from the pressure sensor 11 is the pressure which is previously set. Specifically, the flow control valve 6 and the controller 7 define control means for controlling the flow of cooling water. Further, the load detecting means 10 (in the second embodiment, the pressure sensor 11), the flow control valve 6, and the controller 7 define means for maintaining the temperature of supercharged air supplied to the cylinder 31 at a predetermined value.

Figure 6:
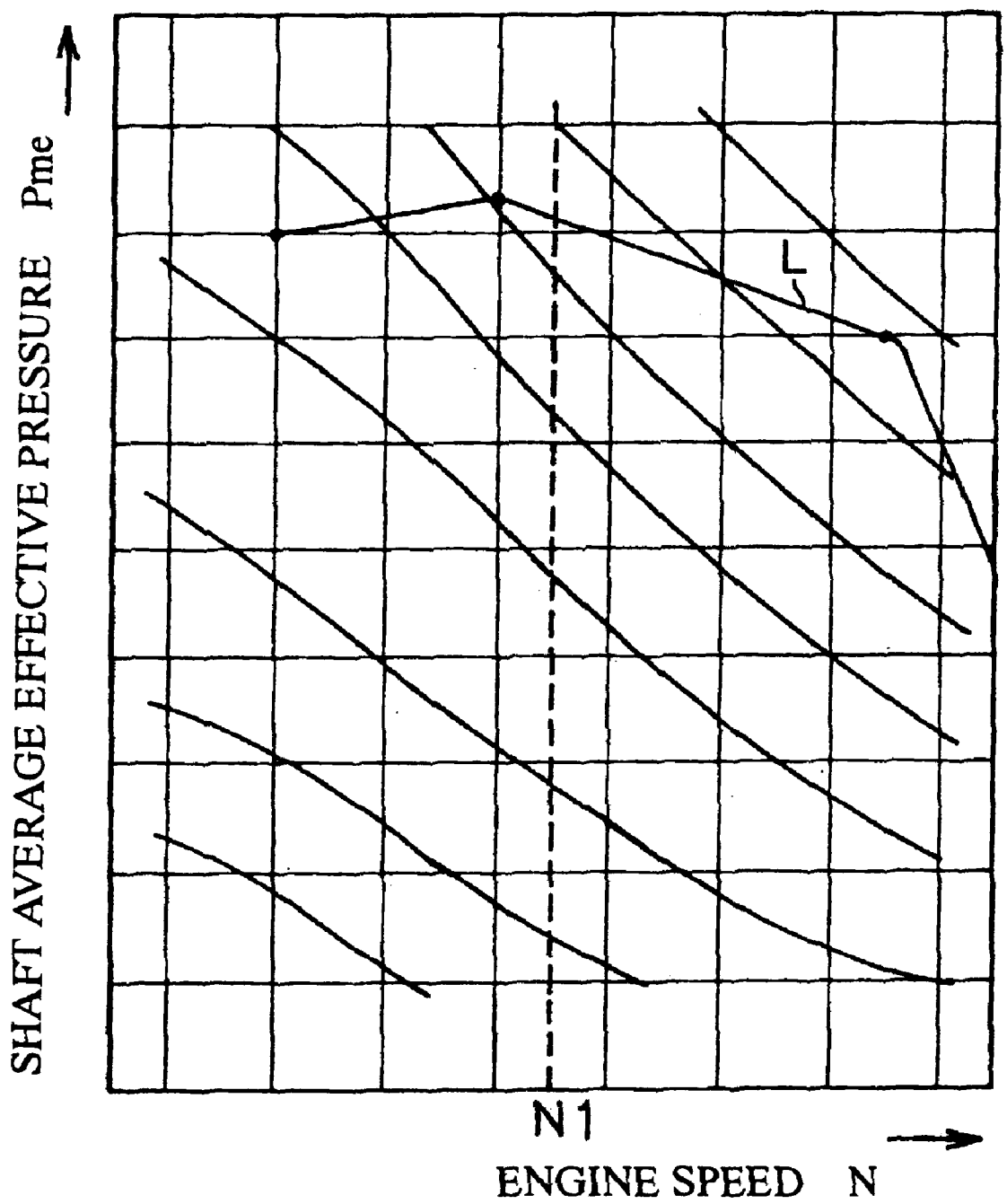
FIG. 6 is a map diagram of supercharged air pressure according to the second embodiment.

An operation and effects of the second embodiment will be explained. FIG. 6 is a map diagram showing relationship between engine output and supercharged air pressure. Specifically, the vertical axis represent shaft average effective pressure Pme, the horizontal axis represents engine speed N, and a curved line L in the graph represents a torque curve. The group of curved lines slanting to the right represents uniform pressure curves of supercharged air pressure P, and the pressure becomes higher toward the right and diagonally upward. Accordingly, on constant engine speed N1 shown by the broken line, output power of the engine 3 (specifically, load of the engine 3) is proportional to the supercharged air pressure P. In the second embodiment, the pressure sensor 11 detects the supercharged air pressure P. The controller 7 computes the output power (load) of the engine 3 from the detected value, and controls the flow of cooling water to the water cooling type of heat exchanger 2b based thereon. Hence it is possible to control the temperature of supercharged air at the outlet port of the water cooling type of heat exchanger 2b to be in a predetermined temperature range, and it is possible to allow the temperature of intake air of the cylinder 31 to converge in a narrower range than in the first embodiment.

Figure 7:
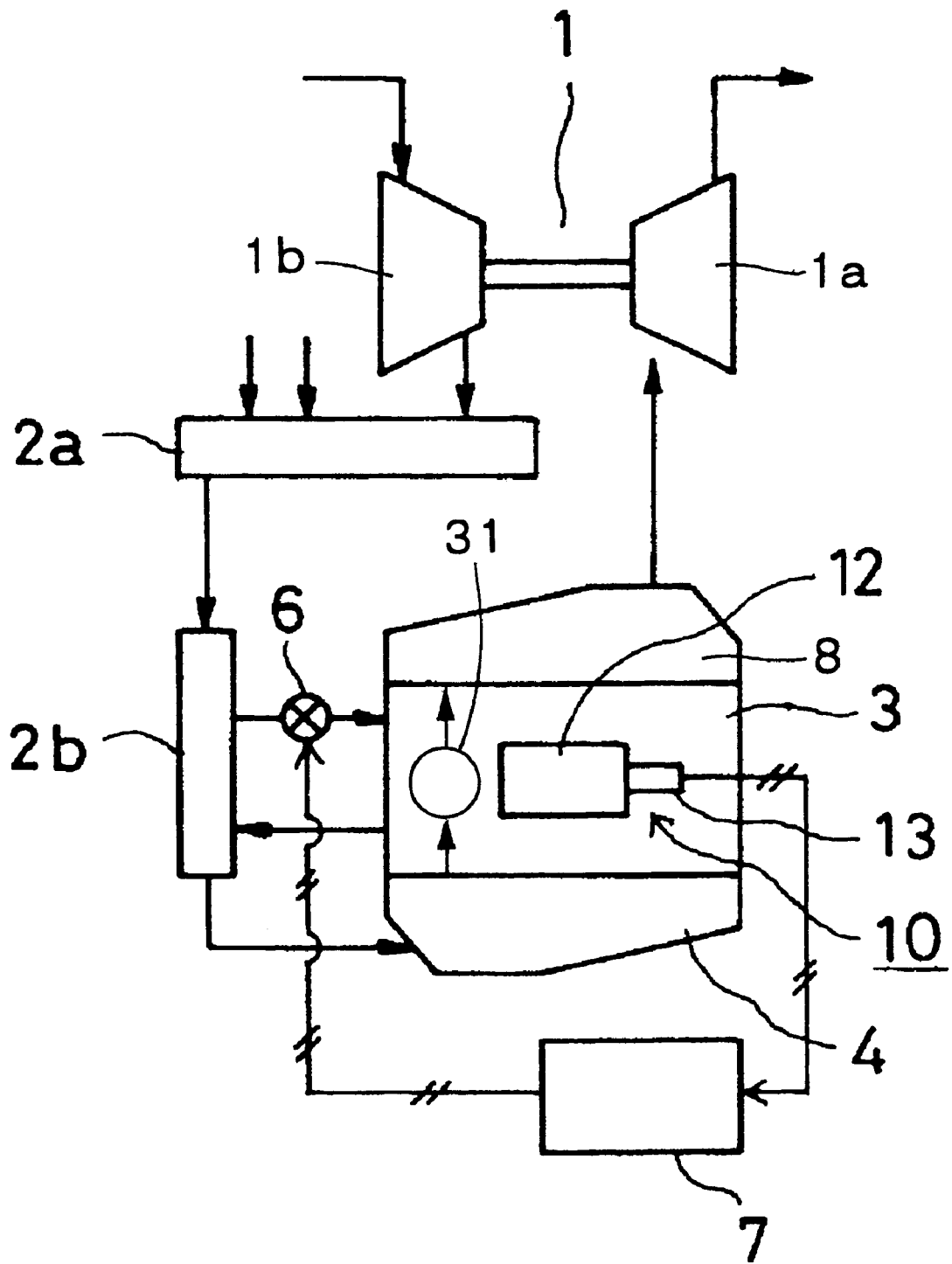
FIG. 7 is a block diagram of a third embodiment of the present invention.

FIG. 7 is a block diagram showing a third embodiment. The same components as in the second embodiment arc given the identical reference numerals and symbols to omit the explanation thereof, and only the different portions will be explained. A fuel injection pump 12 of the engine 3 is provided with a injection quantity sensor 13, which is connected to the controller 7 to define the load detecting means 10. At a constant engine speed, engine load is proportional to fuel injection quantity. Thus, the controller 7 receives input of a detected value of the injection quantity sensor 13, and computes engine load to control the flow of cooling water to the water cooling type heat exchanger 2b. The effects obtained are same as in the second embodiment.

Figure 8:
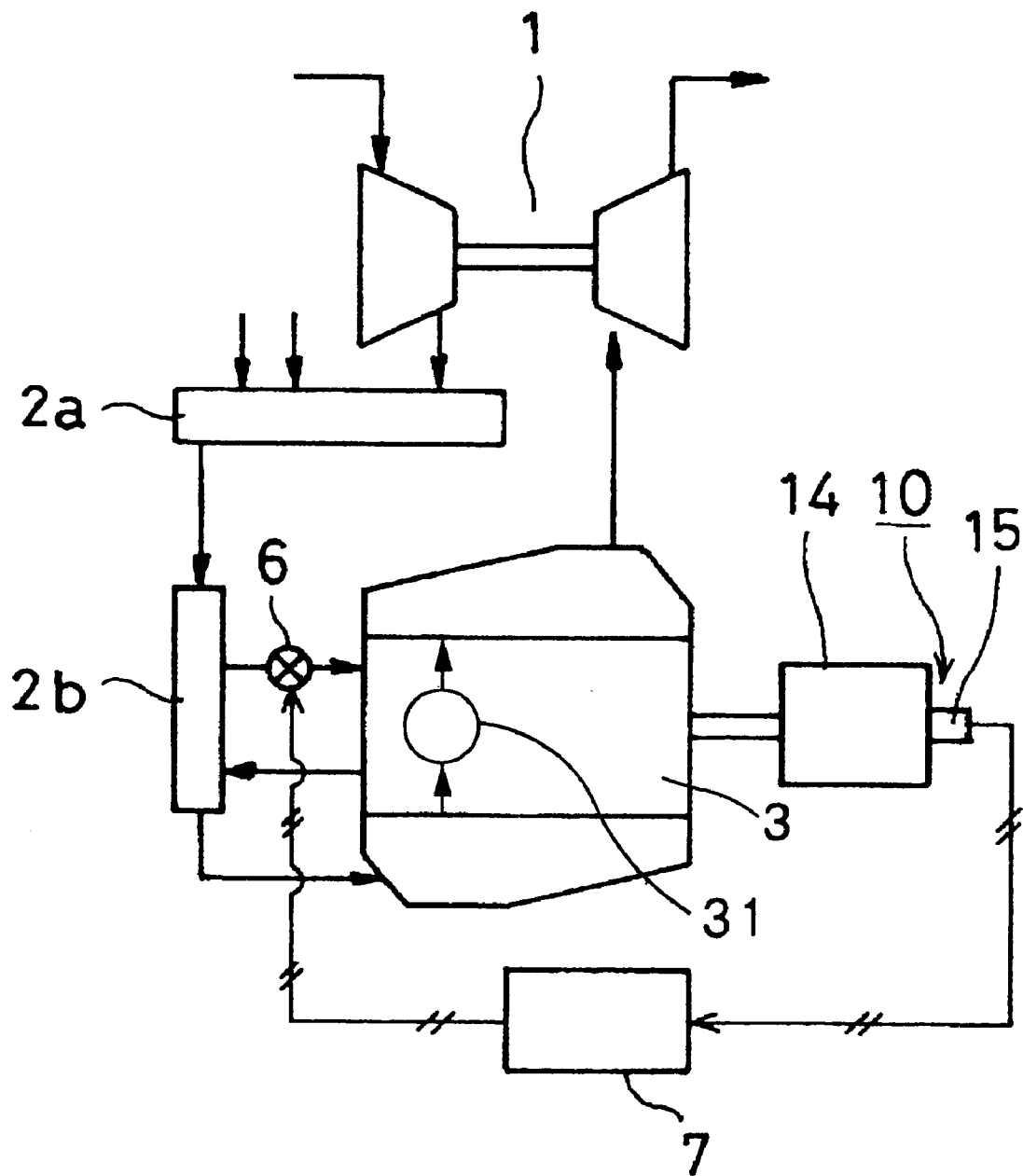
FIG. 8 is a block diagram of a fourth embodiment of the present invention.

FIG. 8 is a block diagram showing a fourth embodiment. Based on the second embodiment, only the different portions will be explained. The engine 3 is connected to a generator 14, and the generator 14 is provided with a watt-meter 15 for detecting output power. The watt-meter 15 is connected to the controller 7 to define the load detecting means 10. The controller 7 receives input of engine load directly from the watt-meter 15, and controls the flow of cooling water to the water cooling type of heat exchanger 2b. The effects obtained are the same as in the second embodiment.

Figure 9:
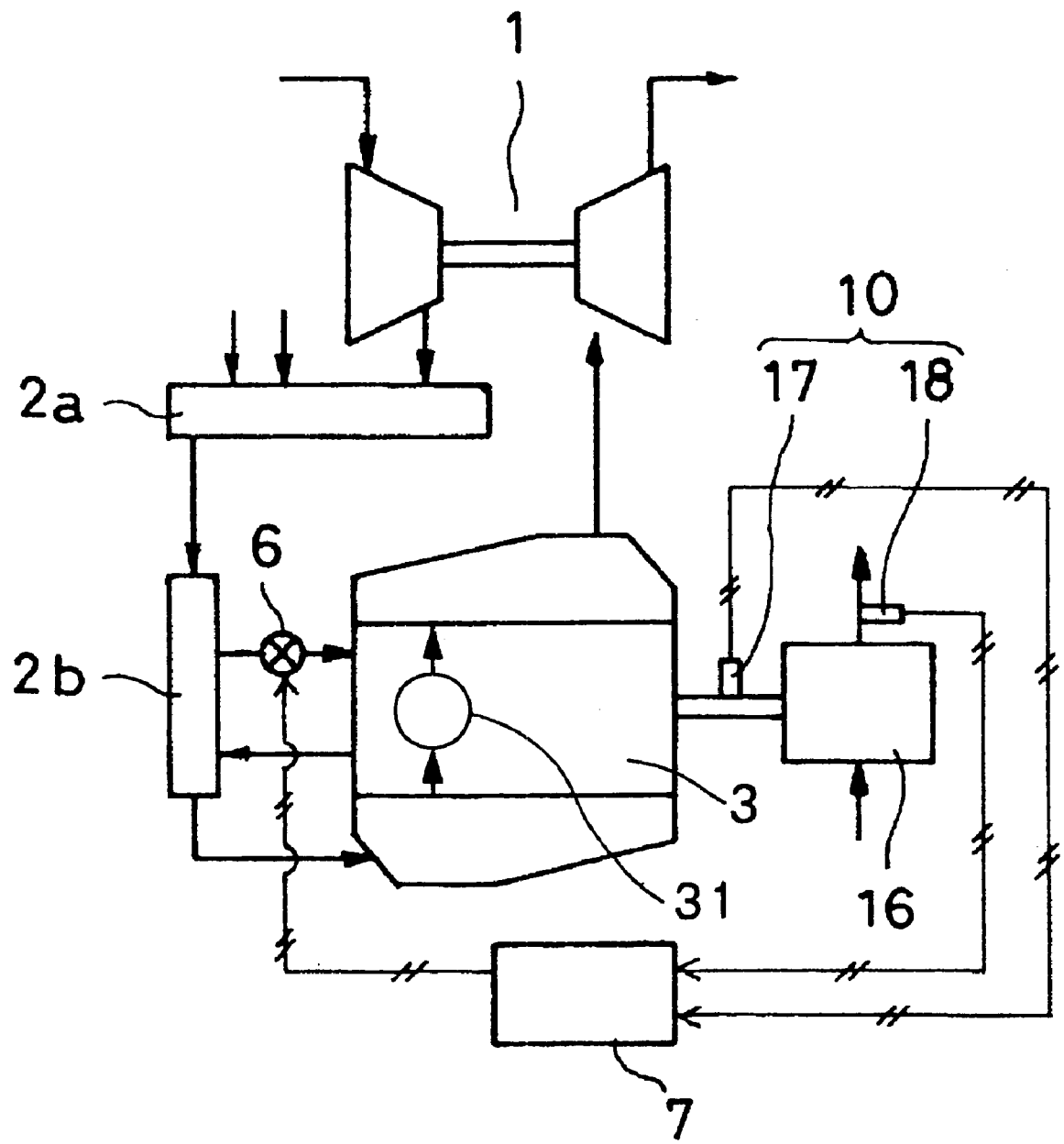
FIG. 9 is a block diagram of a fifth embodiment of the present invention.

FIG. 9 is a block diagram showing a fifth embodiment. Based on the second embodiment, only the different portions will be explained. The engine 3 is connected to a hydraulic pump 16, and a rotation sensor 17 is provided at a connecting portion. The hydraulic pump 16 is provided with a discharge pressure sensor 18. The rotation sensor 17 and the discharge pressure sensor 18 are connected to the controller 7 to define the load detecting means 10. The controller 7 computes the engine load based on the rotational frequency information from the rotation sensor 17 and the discharge pressure information from the discharge pressure sensor 18, and controls the flow of cooling water to the water cooling type of heat exchanger 2b. The effects obtained are the same as in the second embodiment. In the fifth embodiment, the hydraulic pump 16 driven by the engine 3 may be an air compressor.

In the aforementioned embodiments, the heat exchange medium of the first heat exchanger 2a is the outer air A1, but this not restrictive. For example, in the fourth and fifth embodiment, the engine 3 for driving the generator 14 or the hydraulic pump 16 may be a stationary type of diesel engine, and the heat exchange medium of the first heat exchanger 2a may be tap water or cooling tower cooling water. Meanwhile, the heat exchange medium of the second heat exchanger 2b is not limited to the engine cooling water as in the aforementioned embodiments, and engine lubricant oil, for example, may be suitable. In short, it is desired that the first heat exchange medium cools supercharged air and the second heat exchange medium heats supercharged air from the first heat exchanger 2b, when the engine is normally rotated. Thus, as repeated in the above description, the intake air temperatures of the cylinder 31 converge on a narrow range in which the temperatures are less than or near the second heat exchange medium irrespective of outside air temperature and load on the engine.

In the operation and effects of the first embodiment, water emulsion fuel is described as an example of a fuel inferior to light oil in ignitability, and in the second to fifth embodiment, the temperatures of intake air of the cylinder 31 can converge within a narrower range than in the first embodiment. Accordingly, even if, for example, fuel oil A, a waste plastic oil fuel, or the like is used, abnormal combustion hardly occurs in the cylinder 31, and thus the engine 3 which can be operated with stability can be obtained.

What is claimed is:

1. A supercharged diesel engine having a supercharger for pressurizing ambient air into a cylinder, and a heat exchanger being provided in a pressurized air passage between an outlet port of said supercharger and an inlet port of said cylinder for cooling the pressurized air from said supercharger, wherein said heat exchanger is a hybrid type of heat exchanger comprising a first heat exchanger for carrying out heat exchange between the pressurized air discharged from the outlet port of said supercharger and a first heat exchange medium, and a second heat exchanger for carrying out heat exchange between the pressurized air discharged from an outlet port of said first heat exchanger and a second heat exchange medium having higher temperature than said first heat exchange medium, and supplying the pressurized air, after the heat exchange with said second heat exchange medium, to said cylinder.

2. The supercharged diesel engine in accordance with claim 1, wherein the engine is a water cooling type, wherein said first heat exchange medium is ambient air, and wherein said second heat exchange medium is cooling water from said water cooling type engine.

3. The supercharged diesel engine in accordance with claim 2, further comprising:

load detecting means for detecting an engine load of said water cooling type engine; and control means for receiving a detection signal from said load detecting means and controlling flow of cooling water from said water cooling type engine.

4. The supercharged diesel engine in accordance with claim 2 or claim 3, further comprising:

a pressure sensor which is provided between an outlet port of a compressor of said supercharger and an inlet port of said cylinder and detects supercharged air pressure; and control means for receiving a detection signal from said pressure sensor and controlling flow of cooling water from said water cooling type of engine, wherein said water cooling type of engine is used at an almost constant engine speed.

5. The supercharged diesel engine in accordance with claim 1, wherein a fuel used is a water emulsion fuel.

6. The supercharged diesel engine in accordance with claim 5, wherein the engine is a water cooling type of engine with the supercharger using cooling water, wherein said first heat exchange medium is outside air, and wherein said second heat exchange medium is cooling water from said water cooling type of engine.

7. The supercharged diesel engine in accordance with claim 1, further comprising:

load detecting means for detecting an engine load; and control means for receiving a detection signal from said load detecting means and controlling flow of said second heat exchange medium.

8. The supercharged diesel engine in accordance with claim 1 or claim 5, further comprising:

a pressure sensor which is provided between an outlet port of a compressor of said supercharger and an inlet port of said cylinder and detects supercharged air pressure; and control means for receiving a detection signal from said pressure sensor and controlling flow of said second heat exchange medium, wherein the engine is used at an almost constant engine speed.

* * * * *